April 2, 1957  R. G. LE TOURNEAU  2,787,298
HEAVY-DUTY SELF-PROPELLED TREE SAW
Filed Oct. 1, 1954  4 Sheets-Sheet 3

INVENTOR.
Robert G. LeTourneau
BY
Wm. T. Wofford
Attorney

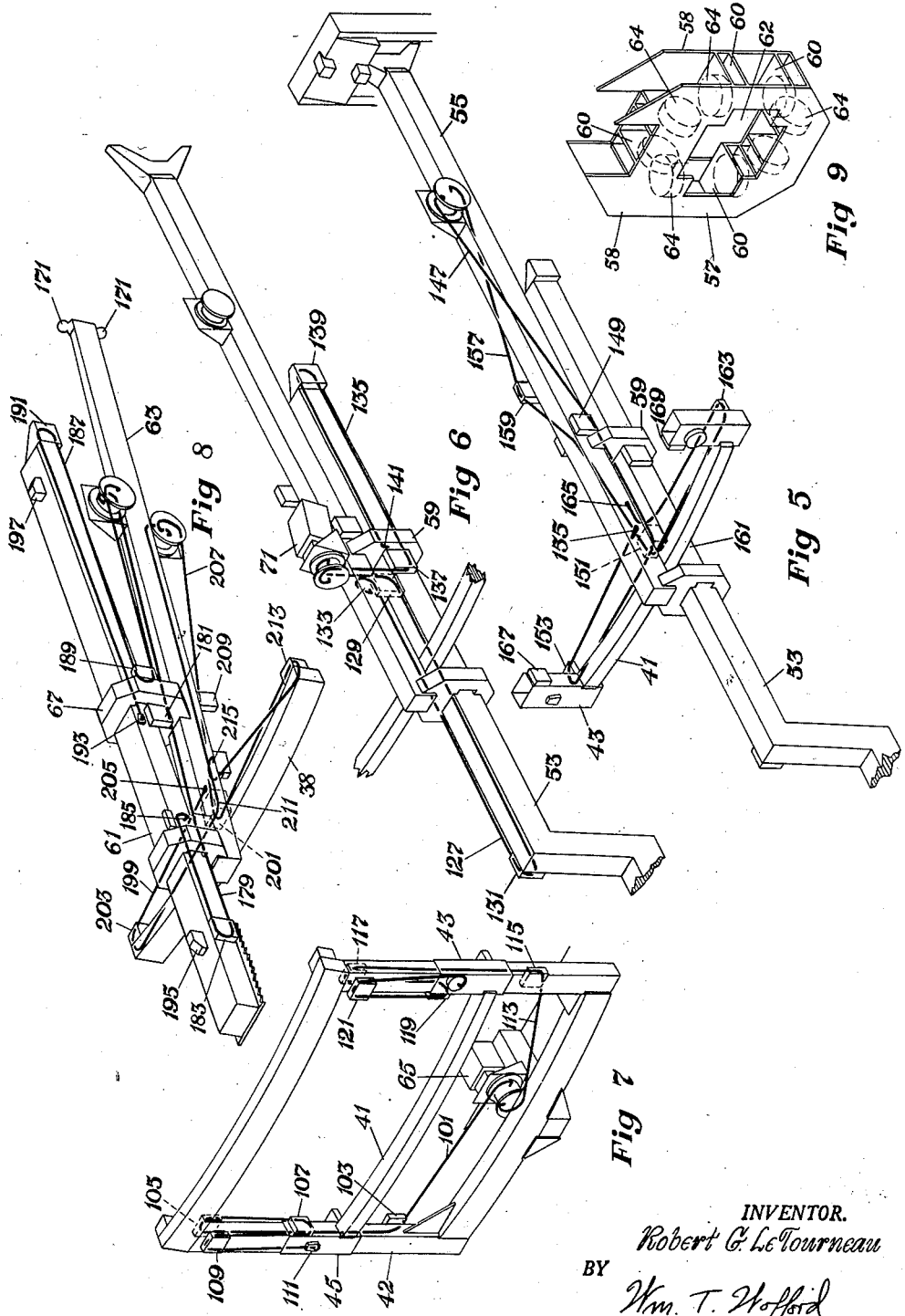

United States Patent Office 2,787,298
Patented Apr. 2, 1957

2,787,298

HEAVY-DUTY SELF PROPELLED TREE SAW

Robert G. LeTourneau, Longview, Tex.

Application October 1, 1954, Serial No. 459,758

6 Claims. (Cl. 143—43)

My invention relates generally to land clearing apparatus, and more particularly to an improved heavy-duty self-propelled tree saw.

Heavy-duty self-propelled tree saws in the prior art of which I am aware are subject to a number of disadvantages. Prior art machines have provided only limited maneuverability range for the tree felling implements, imposing the requirement that the saw vehicle be carefully maneuvered into the initial tree felling position within the range of the implements. When two cuts on a tree were required, it has been necessary to maneuver the saw vehicle into a new position for the second cut. Maneuvering the vehicle for a second cut is not only disadvantageous from a time conserving point of view, but also moving the vehicle makes it very difficult to make a second cut in proper relation to the first cut. Generally speaking, the tree felling implements and their supporting structures have been superimposed on the saw vehicle instead of being integrated with it, resulting in a tendency toward unwieldy cumbersome machines. In addition, prior art machine configuration has not permitted placement of the operator's control station in a position providing either unrestricted field of vision or optimum operator judgment of required implement motion.

Accordingly, broadly speaking, it is an object of my invention to provide an improved heavy-duty self-propelled tree saw which is not subject to the disadvantages above mentioned.

More specifically, it is an object of my invention to provide a heavy-duty self-propelled tree saw wherein less care and precision are required to position the saw vehicle for the felling of a tree, with consequent reduction in the amount of time required for such positioning.

Another object of my invention is to provide a heavy-duty self-propelled tree saw wherein all of the cuts necessary to fell a tree can be effectively made from a single saw vehicle position.

Another object of my invention is to provide an improved heavy-duty self-propelled tree saw wherein cuts which are almost parallel can be made on opposite sides of the tree from a single saw vehicle position.

Another object of my invention is to provide a heavy-duty self-propelled tree saw wherein the power necessary to effect proper lateral movements of the tree felling implements is more efficiently applied, while the structure enabling such lateral movements is made simpler without sacrifice of strength and rigidity.

Another object of my invention is to provide a heavy-duty self-propelled tree saw wherein the operator's control station is positioned to allow optimum operator judgment and unrestricted visibility of movements of the tree felling implements.

Another object of my invention is to provide a heavy-duty self-propelled tree saw characterized by simple rugged construction and improved weight distribution.

Additional objects and advantages of my invention will be apparent from the following description of a preferred embodiment taken together with the accompanying drawings in which.

Figures 5, 6, and 7 are schematic showings of the means providing respectively lateral, longitudinal, and vertical movements of the saw boom assembly;

Figure 8 is a schematic showing of the means providing longitudinal and lateral movement for the pusher arm assembly; and Figure 9 is an enlarged schematic showing of one of the saw boom and pusher arm hangers.

Figure 1:
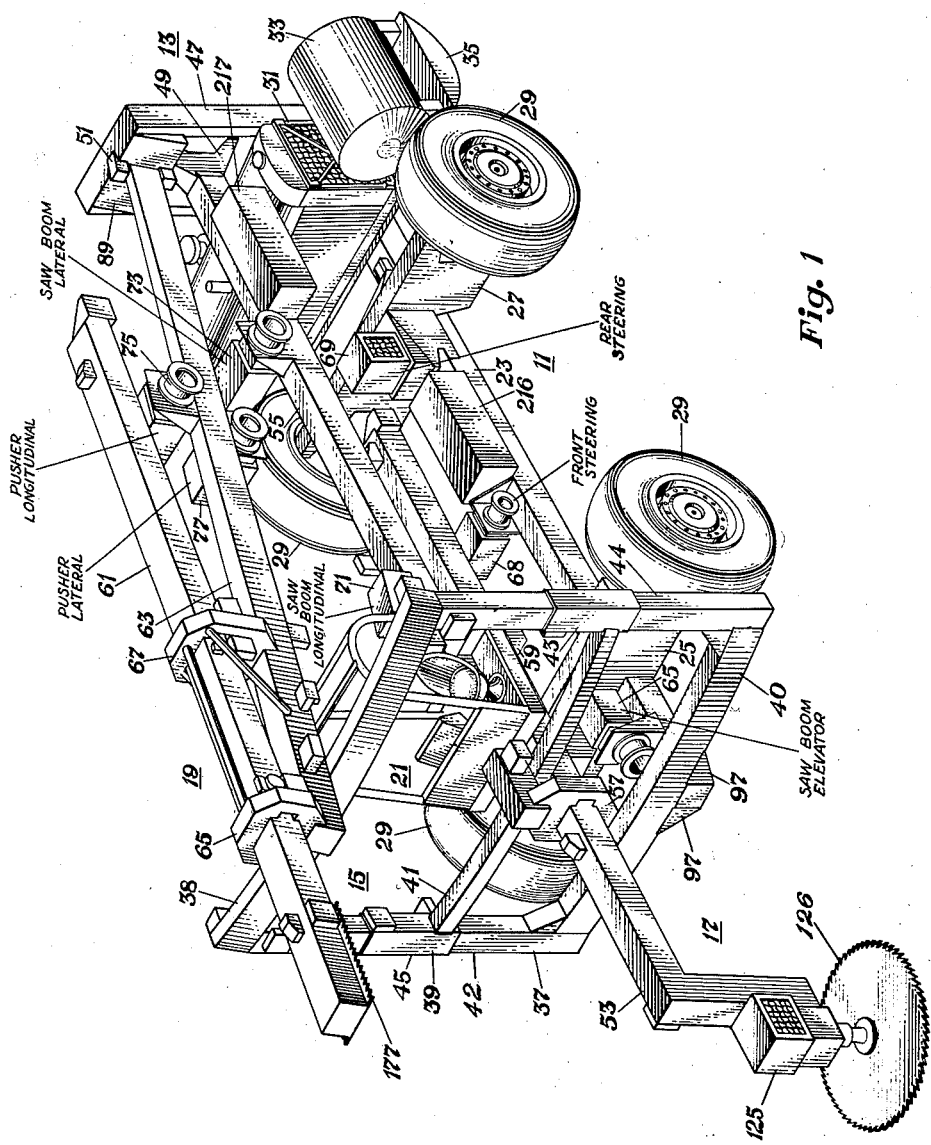
Figure 1 is a simplified perspective view of the entire tree saw machine.

In the interest of clarity, the tree saw will first be generally described and then the major components will be described in detail. The major components of the tree saw can be seen in Figure 1. These are the saw vehicle, 11, the rear support frame and pivots 13, the elevator frame and carriage 15, and the saw boom assembly 17, the pusher arm assembly 19, the operator control station 21. The saw vehicle has a main beam 23 carrying front and rear axles, 25, 27 the rear axle being of the rocking type to enable the vehicle to better accommodate itself to uneven terrain. The axles mount four rubber tired wheels 29, each of which is driven by an electric motor (not shown). Front and rear wheel groups are independently steerable. An engine-generator set 31 and a fuel tank 33 are mounted on a platform 35 at the rear of the saw vehicle. This engine-generator set supplies power for the saw vehicle wheels, for the steering mechanisms, and for all movements of the tree saw implements, as well as for any necessary auxiliary functions such as lighting, etc. The tree saw implements referred to herein are the saw and the pusher arm. The elevator frame 37 comprising horizontally disposed top and bottom cross beams 38, 40 spaced apart by vertical side beams 42, 44, stands upright at the front of the saw vehicle. The elevator carriage 39 comprises a carriage cross member 41 fixed to sleeves 43, 45 which are movable up and down on the elevator frame 37. The rear support frame 47 stands upright at the rear of the vehicle and carries pivots 49, 51 for both the saw boom and pusher arm assemblies.

The saw boom assembly 17 includes a saw boom 53, and a saw boom support beam 55. The saw boom support beam is pivoted at its rear end to a universal pivot 49 which is carried by the rear support frame 47, and bears adjacent its front end on the elevator carriage cross beam 41. Mounted to and depending from the saw boom support beam 55 near its front end are spaced hangers 57, 59. These hangers are provided with openings of suitable shape to accommodate the saw boom 53, and they serve to support the saw boom. The saw boom is movable longitudinally of the saw boom support beam 55 on bearings carried by the hangers. Thus, it may be observed that the front end of the saw boom assembly is capable of movement in any direction in the plane of the elevator frame, and the saw boom 53 is movable longitudinally of the saw boom support beam 55. The up and down movement of the saw boom assembly is provided by the elevator carriage 39, while its lateral movement is provided by traverse of the saw boom support beam 55 on the elevator carriage cross beam 41. The pusher arm assembly 19 comprises the pusher arm 61 and the pusher arm support beam 63. The pusher arm support beam is attached at its rear end to the upper pivot 51 carried by the rear support frame 47, and bears near its front end on the top cross beam 38 of the elevator frame 37. The pusher arm support beam 63 carries spaced hangers 65, 67 which are fixed to its upper side near the front end. These hangers are similar to the saw boom hangers 57, 59 and they support the pusher arm 61 for longitudinal movement. Thus, the pusher arm assembly 19 is capable of lateral movement by traversing on the top cross member 38 of the elevator frame 37 and the pusher arm 61 can move longitudinally of the pusher arm support beam 63.

The vehicle steering mechanism and all of the various tree saw implement movements are powered by electric motor unts. Each electric motor unit is mounted at a location convenient to the point where its power is to be utilized. These motor units, as well as the entire tree saw operation, are controlled from an operator's control station which is located on the front end of the saw boom support beam. Each electric motor unit comprises an electric motor driving a cable drum through a gear box. Each electric motor unit is provided with a braking mechanism which is automatically engaged to hold the cable drum against rotation when the motor is de-energized. The particular cable and sheave arrangements for the various movements will be hereinafter fully described. The various electric motor units, by function and location are as follows: The elevator motor unit 65 is mounted on the front end of the main beam 23 just ahead of the front axle 25; the front steering motor unit 68 is mounted on the main beam near its center; the rear steering motor unit 69 is mounted on the main beam just in front of the rear axle 27; the saw boom longitudinal movement motor unit 71 is mounted on the saw boom support beam 55 just behind the operator's control station 21; the saw boom lateral movement motor unit 73 is mounted on the saw boom support beam 55 at a point about even with the saw vehicle rear wheels; the pusher arm longitudinal movement motor unit 75 is mounted on top of the pusher arm support beam at a point about midway between the rear hanger 67 and the pivot 51; the pusher arm lateral movement motor unit 77 is mounted on the under-side of the pusher arm support beam 63 just below the pusher arm longitudinal movement motor unit 75.

The major components of the tree saw will now be described with more detail as follows:

The saw vehicle

The saw vehicle 11 comprises the main beam 23, front and rear axles 25, 27, wheels 29 and wheel drivers (not shown), steering mechanism (not shown), engine-generator set 31, fuel tank 33, and platform 35. The main beam 23 is a long hollow box-beam of rectangular cross-section, fabricated by welding a pair of spaced channel members to a pair of steel plate strips. The front and rear axles 25, 27 are disposed transversely of the main beam. The axles are of hollow construction, fabricated by welding steel plate sections of appropriate shapes. The end portions of the axles have large, generally U-shaped openings therein, to provide mounting means for the wheels and to accommodate the electric motors which drive the wheels. Inwardly disposed balls 79 are fixed to opposite inner-faces of each axle opening near the opening extremities. These balls cooperate with sockets on the wheel assemblies and provide the bearing surfaces for supporting the axles on the wheel assemblies. For details of a suitable electric wheel structure, reference is made to my co-pending application, Serial No. 181,038, filed August 23, 1950, entitled Electric Wheel, issued as Patent No. 2,726,776. The front axle 25 is fixed by welding to the main beam 23. The rear axle 27 has a large opening at the center portion of its bottom side so that it straddles the main beam. The main beam is actually suspended from the rear axle by a pair of ball and socket pivots 81 disposed on either side of the rear axle longitudinally of the main beam. This arrangement provides for limited rocking movement of the rear axle 27 with respect to the main beam 23. The platform 35 located behind the rear axle 27 is fixed to and extends transversely of the main beam 23. This platform carries the power generating unit 31 and its fuel supply tank 33. The power generating unit is an internal combustion engine driving an alternating current generator. Steering power is supplied to the front and rear wheel pairs by electric motor units 68, 69 respectively. Reference is made to my co-pending application, Serial No. 329,498, filed January 5, 1953, entitled Mobile Tree Saw and Pusher Arm, issued October 18, 1955, as Patent No. 2,720,896, for details of a suitable steering arrangement.

The rear support frame and pivots

Figure 2:
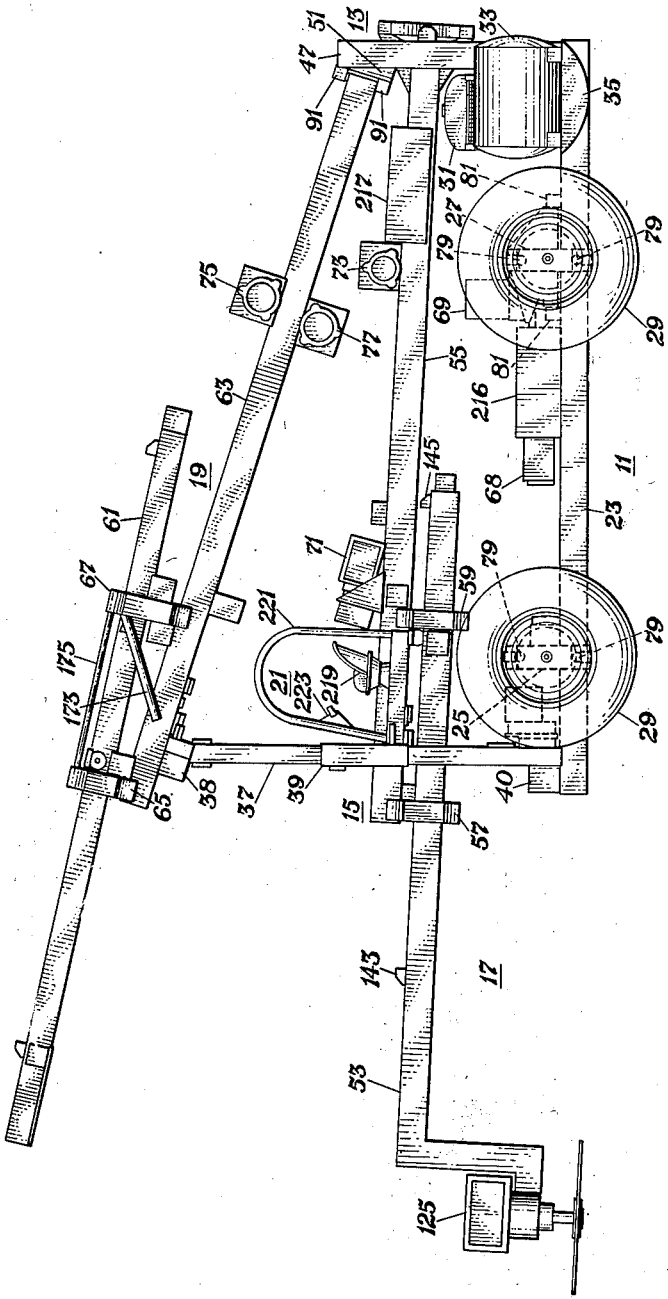
Figure 2 is a simplified side elevational view.
Figure 4:
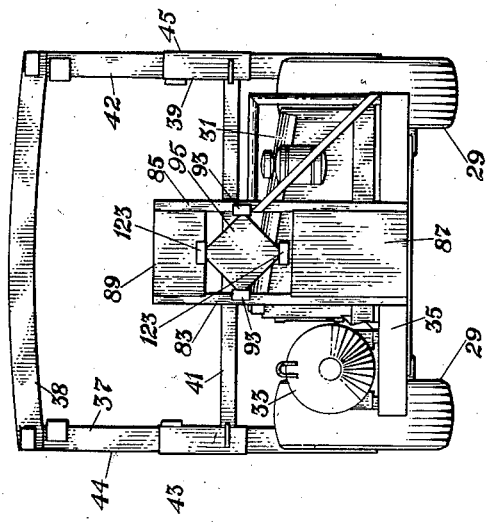
Figure 4 is a simplified rear elevational view.

The rear support frame includes a pair of spaced upright members 83, 85 which have their lower ends welded to the sides of the rear end of the main beam 23. The upright members are held rigid by suitable bracing, including a heavy steel plate 87 (Fig. 4) bridging the lower portions of the upright members, and a steel slab 89 welded to the innerfaces of the upper portions of the upright members. This slab 89 also serves as the support for the pusher arm assembly pivot 51. A pair of sockets 91 (Fig. 2) are fixed one above the other on the forward face of the slab 89 to provide for lateral pivoting of the pusher arm assembly 19.

A socket 93 is fixed to the back side of each upright member 83, 85 at a point intermediate the upper edge of the heavy steel bridging plate 87 and the lower edge of the pusher arm assembly pivot support 89. These sockets 93, which are in horizontal alignment, carry the universal pivot block 95 for the saw boom assembly pivot. The pivot block 95 is a rectangular slab having a ball fixed to and extending from each of the four corners, the balls being diagonally aligned. The pivot block is mounted to the rear support frame by means of a pair of opposite balls which are received by the sockets 93 which are fixed to the upright members.

The elevator frame and carriage

Figure 3:
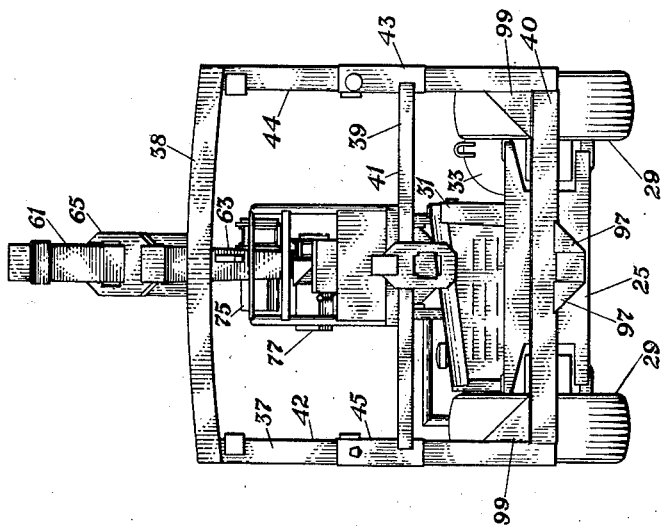
Figure 3 is a simplified front elevational view wherein the saw boom assembly is omitted.

The elevator frame is generally rectangular in shape and is made up of horizontally disposed top and bottom cross beams 38, 40 spaced apart by vertical side beams 42, 44. The elevator frame 37 is centered on the front end of the main beam 23 in an upright position, and is fixed thereto by means including triangular braces 97 (Fig. 3) welded to the sides of the main beam and to the bottom cross beam 40. Triangular braces 99 welded to the bottom cross beam 40 and the vertical side beams 42, 44 contribute to the rigidity to the elevator frame structure.

The elevator carriage 39 comprises a cross member 41 fixed at its ends to sleeves 43, 45 which are adapted for sliding up and down on the elevator side beams 42, 44. The elevator carriage is powered by a motor unit and cable arrangement as best shown in Figure 7. The motor unit 65 is mounted on the main beam just behind the elevator frame, and includes an electric motor driving a cable drum through a gear box. The cable drum carries two cables. The first cable 101 is fixed at one end to the drum at the flange nearest the gear box, and extends laterally to the right with regard to the operator (to the left in Fig. 7) through a first sheave 103 mounted on the rear face of the right-hand vertical side beam 42 on about the level of the cable drum, thence upward through a second sheave 105 also mounted on the rear face of the vertical side beam but near the top portion thereof, thence downward and through a third sheave 107 mounted on the innerface of the right-hand carriage sleeve, thence upward again and through a fourth sheave 109 mounted on the front face of the vertical side beam at about the same level as the second sheave 105, and thence downward and dead-ended at the other end on a cable tightener 111, which is fixed to the front face of the carriage sleeve 45. The second cable 113 has one end fixed at the outer flange of the cable drum and extends laterally to the left and is threaded through sheaves 115, 117, 119, 121 on the left-hand vertical side beam 44 and carriage sleeve 45, and fixed at the other end to the left-hand carriage sleeve 43, all in the same manner as the first cable 101. When the motor runs in one direction, both cables 101, 113 are wound up on the drum at the same rate, raising the elevator carriage. When the motor runs in the opposite direction, the cables are payed off the drum at the same rate, lowering the elevator carriage. The motor unit 65 is provided with braking means which are automatically engaged when the motor is de-energized, thus holding the cable drum, and consequently the elevator carriage, against movement when the motor is stopped. Limit switches (not shown) act to prevent over-travel of the elevator carriage.

The saw boom assembly

The saw boom support beam 55 bears adjacent its front end on the elevator carriage cross-beam 41. The rear end of the saw boom support beam 55 is bifurcated. The bifurcated portion carries a pair of sockets 123 (Fig. 4), one above the other at its extremities. These sockets cooperate with the vertically spaced balls on the universal pivot block 95.

The spaced hangers 57, 59 depending from the forward end of the saw boom support beam 55 are each fabricated by welding a pair of large spaced plates 58 to the support beam and by welding small transverse plates 60 in spaced pairs at intervals between the large plates (as shown in Fig. 9). The large plates are provided with central opening 62 to accommodate the saw boom. Each pair of the small transverse plates 60 serves as a guide-housing and shaft support for a roller 64 which is mounted to bear against the saw boom. Thus the saw boom bears on rollers which are carried by the hangers 57, 59. The saw boom 53 has a depending L-shaped portion at its forward end. The horizontal portion of the depending L extends forwardly, and mounts the saw unit 125, which comprises a circular saw 126 driven by an electric motor through a gear box.

The saw boom 53 is powered for movement longitudinally of the saw boom support beam 55 by means of a motor unit and cable arrangement as best shown by Figure 6. The motor unit 71 is mounted on a bracket which is fixed to the upper side of the saw boom support beam and is located just behind the operator's control station 21. The motor unit includes an electric motor driving a cable drum through a gear box. The cable drum carries two cables. The first cable 127 is fixed at one end to the drum at the flange nearest the gear box, and extends downwardly and through a first sheave 129 mounted on the front right side of the rear saw boom hanger 59, thence forwardly along the right side of the saw boom to a second sheave 131 mounted at the forward end and on the right side of the saw boom 53, thence rearwardly along the saw boom and dead-ended on a cable tightener 133 which is fixed to the front side of the rear hanger just above the first sheave 129. The second cable 135 is fixed at one end to the cable drum at the outer flange of the cable drum and extends downwardly and through a third sheave 137 mounted on the front left side of the rear saw boom hanger, 59, thence rearwardly along the left side of the saw boom to a fourth sheave 139 which is fixed to the rear end of the saw boom 53, thence forwardly along the left side of the saw boom and dead-ended on a cable tightener 141 which is fixed to the left rear side of the rear saw boom hanger 59. When the motor runs in one direction, one cable is payed in while the other is payed out, causing longitudinal movement of the saw boom in one direction. When the motor rotates in the other direction the cable action is just opposite, and the saw boom moves longitudinally in the other direction. Front and rear limit switches 143, 145 (Fig. 2) mounted on the saw boom 53 act to prevent saw boom over-travel.

The saw boom support beam 55 is powered for movement laterally on the elevator carriage cross-beam 41 by means of a motor unit and cable arrangement as best shown by Figure 5. The motor unit 73 is mounted on a bracket which is fixed to the upper side of the saw boom support beam at a point about even with the saw vehicle rear wheels. The motor unit includes an electric motor driving a cable drum through a gear box. The cable drum carries two cables. The first cable 147 is fixed to one end of the drum at the flange nearest the gear box, and extends forwardly at a slight angle downward, passes through a first sheave 149 fixed to the left side of the saw boom support beam just behind the rear saw boom hanger 59, thence forwardly through a second sheave 151 fixed to the bottom side of the saw boom support beam 55 just behind the elevator carriage cross-beam, thence laterally to the right to a third sheave 153 fixed to the rear side of the right hand elevator frame side beam 43 at the level of the elevator carriage cross-beam 41, thence laterally back to the left to a cable tightener 155 fixed to the saw boom support beam 55 near its forward end. The second cable 157 is fixed at one end to the cable drum at the outer flange of the drum and extends forwardly at a slight angle upward over a fourth sheave 159 which is fixed to the right side of the saw boom support beam, thence forward and at a slight angle downward to a fifth sheave 161 located just under and in the same housing as the second sheave 151, thence laterally to the left along the elevator carriage cross-beam through a sixth sheave 163 fixed to the rear side of the left hand elevator frame side beam 44, thence laterally back to the right and dead-ended on a cable tightener 165 fixed to the left side of the saw boom support beam. When the motor runs in one direction, one cable is payed in while the other cable is payed out, causing lateral movement of the saw boom assembly 17 in one direction. When the motor rotates in the other direction the cable action is just opposite, and the saw boom assembly moves laterally in the other direction. Limit switches 167, 169 mounted on opposite inner-faces of the elevator carriage side beams are actuable by the saw boom support beam, and act to obviate any tendency toward over-travel of the saw boom assembly in the lateral directions.

The pusher arm assembly

The pusher arm support beam 63 bears near its forward end on the top cross-beam 38 of the elevator frame 15. Balls 171 (Fig. 8), fixed one above the other on the rear end of the pusher arm support beam cooperate with the sockets on the rear support frame upper pivot 51. The upper pivot mount 89 (Fig. 1) is tilted from the vertical to a position which allows the pusher arm support beam 63 to rise forwardly of the pivot 51 and bear on the elevator frame upper cross-beam 38 without binding. The elevator frame upper cross-beam 38 is also tilted slightly from the vertical so as to present its entire upper face as a bearing surface for the pusher arm support beam.

Spaced hangers 65, 67 are fixed to the upper side of the pusher arm support beam 63 at its forward end. These hangers 65, 67 are substantially identical in construction to the saw boom hangers 57, 59 which have already been described. Bracing members 173, 175 (Fig. 2) contribute to the rigidity of the pusher arm hangers 65, 67. The pusher arm 61 is mounted in the hangers 65, 67 and bears on the rollers which are carried by the hangers. The pusher arm 61 has a rectangular plate 177 fixed to the lower side of its forward end. The sides of the plate, which extend slightly beyond the sides of the pusher arm, are serrated to provide good tree gripping action.

The pusher arm assembly 19 is powered for longitudinal and lateral movements by electric motor units as best shown by Figure 8. The pusher arm longitudinal movement motor unit 75 (Figs. 1 and 2) is mounted on a bracket which is fixed to the top of the pusher arm support beam 63 at a point about midway between the rear hanger 67 and the pivot 51. The motor unit includes an electric motor driving a cable drum through a gear box. The cable drum carries two cables. The first cable 179 is fixed at one end to the cable drum at the flange nearest the gear box and extends forwardly under a first sheave 181 which is fixed to the left front face of the rear hanger, thence forward and at a slight angle upward, to a second sheave 183 fixed to the left side of the pusher arm near its forward end, thence rearward along the pusher arm and dead-ended on a cable tightener 185 which is fixed to the left side of the pusher arm. The second cable 187 is fixed at one end to the cable drum at the outer flange of the cable drum and extends forwardly along the pusher arm support beam to a third sheave 189 which is fixed to the left rear face of the rear hanger, thence rearwardly to a fourth sheave 191 which is fixed to the rear end of the pusher arm 61, thence forwardly along the pusher arm and dead-ended on a cable tightener 193 which is fixed to the left side of the pusher arm at a point about midway between its ends. When the motor unit runs in one direction, one cable is payed in while the other cable is payed out, causing longitudinal movement of the pusher arm 61 in one direction. When the motor rotates in the other direction the cable action is just opposite and the pusher arm 61 moves longitudinally in the other direction. Front and rear limit switches 195, 197 mounted on the pusher arm act to prevent pusher arm over-travel. The pusher arm lateral movement motor unit 77 (Figs. 1 and 2) is mounted on a bracket which is fixed to the under-side of the pusher arm support beam just below the pusher arm longitudinal movement motor unit. The motor unit includes an electric motor driving a cable drum through a gear box. The cable drum carries two cables. The first cable 199 is fixed to one end of the drum at the flange nearest the gear box, and extends forwardly to a first sheave 201 which is fixed to the under-side of the pusher arm support beam 63 at a point just behind the elevator frame upper crossbeam, thence laterally to the right to a second sheave 203 fixed to the rear side of the elevator frame upper cross-beam adjacent its end, thence laterally back to the left and dead-ended on a cable tightener 205 fixed to the under-side of the pusher arm support beam. The second cable 207 is fixed at one end to the cable drum at the outer flange of the drum and extends forwardly over a third sheave 209 which is fixed to the under-side of the pusher arm support beam 63 at a point underneath the rear hanger 67, thence forwardly and at a slight angle upward to a fourth sheave 211 located just underneath and in the same housing as the first sheave 201, thence laterally to the left to a fifth sheave 213 which is fixed to the rear side of the elevator frame upper cross-beam 38 adjacent its end, thence laterally back to the right and dead-ended on a cable tightener 215 on the bottom side of the pusher arm support beam 63. When the motor runs in one direction, one cable is payed in while the other cable is payed out, causing lateral movement of the pusher arm assembly 19 in one direction. When the motor rotates in the other direction the cable action is just opposite, and the pusher arm assembly moves laterally in the other direction. Limit switches (not shown) are provided adjacent the ends of the elevator frame upper cross-beam, and act to obviate any tendency toward over-travel of the pusher arm assembly in the lateral directions.

*The operator's control station*

The operator's control station 21 (Figs. 1 and 2) is mounted astride the saw boom support beam 55 near its forward end just behind the elevator frame 15, and includes a seat 219, a protective housing 221, and a control panel 223. The protective housing 221 comprises a rigid open framework structure in the shape of an inverted U, which is covered except at its ends with heavy mesh wire (not shown). The control panel 223 is conveniently located in front of the seat 219. The saw vehicle steering mechanism and all of the saw implement movements are controlled by means of "finger-tip" control switches (not shown) located on the control panel 223, and which actuate contactors to open or close the proper circuits to effect desired operations. The contactors are located in two weather proof metal boxes 216, 217, one being mounted on top of the main beam 23 near its center portion and the other being fixed to the left rear portion of the saw boom support beam 55.

In operation, the saw vehicle need not be positioned accurately with respect to a tree to be felled, but only within convenient saw boom and pusher arm range. The operator then, by means of the "finger-tip" controls, extends the pusher arm so that the serrated blade is even with the tree body and on the side opposite the desired felling direction. The tree is then properly pre-stressed in the felling direction by lateral pressure exerted by the pusher arm. Due to the unique rugged structure and arrangement of the pusher arm assembly, its pivots and movement means, the lateral pressure available is limited only by the lateral traction of the vehicle front wheels. The saw is then brought to bear on the tree on the same side as the pressure arm and the tree is quickly felled in the desired direction. If the tree to be felled is large enough to require two cuts, then the saw vehicle front is approximately centered on the tree so that the saw and pusher can work on either side of the tree. Thus, the second cut can be quickly and easily made in proper relation to the first cut, because the saw vehicle has not changed position. The fact that two cuts can be made from a single saw vehicle position achieves the double advantage of proper positioning of the second cut and a saving of time that would otherwise be involved in re-positioning the saw vehicle. Because the saw boom assembly is pivoted at the rear of the vehicle, the distance from the pivot to the saw is great enough to allow the making of almost parallel cuts on opposite sides of a tree from a single saw vehicle position. This gives much improved control of the tree felling direction since the "tree undercut" will have an almost constant width rather than the sharply varying width as for short saw-to-pivot distances. The term "tree undercut" is herein used to designate that portion of the tree lying between the horizontal planes of saw cuts made on opposite sides of the tree and vertical planes passing through the line of deepest penetration on both cuts.

The operator control station is mounted on the forward end of the saw boom support beam so that the operator actually moves laterally and vertically with the saw, and has an unrestricted field of view. It has been found that this location of the control station provides for optimum operator judgment of the required vehicle and implement movements.

While I have shown my invention in only one form, it will be obvious to those securely skilled in the art that it is not so limited, but is susceptible of various changes and modifications without departing from the spirit thereof. For example, the steering and various implement movements may be accomplished by racks and pinions instead of cable and sheave arrangements. The foregoing disclosure and the showings made in the drawings are merely illustrative of the principles of my invention, and are not to be interpreted in a limiting sense.

I claim:

1. A self-propelled mobile tree saw comprising a rigid main frame supported by front and rear wheel groups at least one of which is power-driven and at least one of which is steerable, an elevator mounted on said main frame adjacent said front wheel group and including a carriage, means to impart controlled vertical movement to said carriage, a support member fixed to said carriage and extending transversely of said main frame, an upstanding support frame fixed to said main frame adjacent said rear wheel group, a universal pivot structure mounted to said support frame, a saw boom support beam fixed at one end to said pivot structure and bearing adjacent the other end for lateral movement on said support member, means to impart controlled lateral movement to said saw boom support beam, a saw boom mounted for movement longitudinally of said saw boom support beam, means to impart controlled longitudinal movement to said saw boom, and a power-driven saw mounted adjacent the forward end of said saw boom.

2. A self-propelled mobile tree saw comprising a rigid main frame supported by front and rear wheel groups at least one of which is power-driven and at least one of which is steerable; an elevator mounted on said main frame adjacent said front wheel group, said elevator comprising a base member fixed to and extending transversely of said main frame, a pair of upstanding track members fixed to opposite ends of said base member, a carriage mounted for vertical movement on said track members; an upstanding support frame fixed to said main frame adjacent said rear wheel group, a universal pivot structure mounted to said support frame, a saw boom support beam fixed at one end to said pivot structure and bearing adjacent the other end on said carriage for lateral movement between said track members, means to impart controlled lateral movement to said saw boom support beam, a saw boom mounted for movement longitudinally of said saw boom support beam, means to impart controlled longitudinal movement to said saw boom, and a power-driven saw mounted adjacent the forward end of said saw boom.

3. A self-propelled mobile tree saw comprising a rigid main frame supported by front and rear wheel groups at least one of which is power-driven and at least one of which is steerable; an elevator mounted on said main frame adjacent said front wheel group, said elevator comprising a base member fixed to and extending transversely of said main frame, a pair of upstanding track members fixed to opposite ends of said base member; a carriage mounted for vertical movement on said track members; an upstanding support frame fixed to said main frame adjacent said rear wheel group, a universal pivot structure mounted to said support frame, a saw boom support beam fixed at one end to said pivot structure and bearing adjacent the other end on said carriage for lateral movement between said track members, an operator's control station mounted on and adjacent the forward end of said saw boom support beam, means to impart controlled lateral movement to said saw boom support beam, a saw boom mounted for movement longitudinally of said saw boom support beam, means to impart controlled longitudinal movement to said saw boom, and a power-driven saw mounted adjacent the forward end of said saw boom.

4. A self-propelled mobile tree saw comprising a rigid main frame supported by front and rear wheel groups at least one of which is power-driven and at least one of which is steerable, an elevator mounted on said main frame forward of said front wheel group and including a carriage, means to impart controlled vertical movement to said carriage, a support member fixed to said carriage and extending transversely of said main frame, an upstanding support frame fixed to said main frame rearward of said rear wheel group, a universal pivot structure mounted to said support frame, a saw boom support beam fixed at one end to said pivot structure and bearing adjacent the other end for lateral movement on said support member, means to impart controlled lateral movement to said saw boom support beam, a saw boom mounted for movement longitudinally of said saw boom support beam, means to impart controlled longitudinal movement to said saw boom and a power-driven saw mounted adjacent the forward end of said saw boom.

5. A self-propelled mobile tree saw comprising a rigid main frame supported by front and rear wheel groups at least one of which is power-driven and at least one of which is steerable; an elevator frame mounted on said main frame adjacent said front wheel group and comprising a base member fixed to and extending transversely of said main frame, a pair of upstanding side members fixed to opposite ends of said base member, and a top member bridging said side members; a carriage mounted for vertical movement on said frame and comprising a cross member, an upstanding support frame fixed to said main frame adjacent said rear wheel group, a universal pivot structure mounted to said support frame, a saw boom support beam fixed at one end to said pivot structure and bearing adjacent the other end on said cross member for lateral movement between said side members, means to impart controlled lateral movement to said saw boom support beam, a saw boom mounted for movement longitudinally of said saw boom support beam, means to impart controlled longitudinal movement to said saw boom, a power-driven saw mounted adjacent the forward end of said saw boom, a tree pusher arm pivoted at one end to said support frame and bearing intermediate its ends on said top member, and means to impart controlled lateral motion to said pusher arm.

6. A self-propelled mobile tree saw comprising a rigid main frame supported by front and rear wheel groups at least one of which is power-driven and at least one of which is steerable; an elevator frame mounted on said main frame adjacent said front wheel group and comprising a base member fixed to and extending transversely of said main frame, a pair of upstanding side members fixed to opposite ends of said base member, and a top member bridging said side members; a carriage mounted for vertical movement on said frame and comprising a cross member, an upstanding support frame fixed to said main frame adjacent said rear wheel group, a universal pivot structure mounted to said support frame, a saw boom support beam fixed at one end to said pivot structure and bearing adjacent the other end on said cross member for lateral movement between said side members, means to impart controlled lateral movement to said saw boom support beam, a saw boom mounted for movement longitudinally of said saw boom support beam, means to impart controlled longitudinal movement to said saw boom, a power-driven saw mounted adjacent the forward end of said saw boom, a tree pusher arm support pivoted at one end to said support frame and bearing adjacent its other end on said top member, a pusher arm mounted for movement longitudinal of said pusher arm support, means to impart controlled lateral motion to said pusher arm support and means to impart controlled longitudinal movement to said pusher arm.

References Cited in the file of this patent
UNITED STATES PATENTS

| Number | Name | Date |
|---|---|---|
| Re. 23,985 | Wanget | Nov. 9, 1954 |
| 1,602,357 | Georgelis | Oct. 5, 1926 |
| 1,830,871 | Domagala | Nov. 10, 1931 |
| 2,404,655 | Randall | July 23, 1946 |
| 2,426,694 | King | Sept. 2, 1947 |
| 2,461,589 | Crawford | Feb. 15, 1949 |
| 2,542,952 | White | Feb. 10, 1951 |
| 2,566,088 | LeTourneau | Aug. 28, 1951 |